United States Patent [19]

LaPrade et al.

[11] 4,295,669
[45] Oct. 20, 1981

[54] THERMAL INSULATION ESPECIALLY FOR PIPE, FLANGES AND FITTINGS

[75] Inventors: Steve A. LaPrade; John M. Pallo, both of Englewood, Colo.

[73] Assignee: Johns-Manville Corporation, Denver, Colo.

[21] Appl. No.: 786,746

[22] Filed: Apr. 11, 1977

[51] Int. Cl.³ .............................................. F16L 11/12
[52] U.S. Cl. ........................................ 285/47; 285/93; 285/419
[58] Field of Search ...................... 285/47, 53, 48, 15, 285/93, 293, 236, 45, 373, 419; 138/97, 99, 149; 137/312, 375

[56] References Cited

U.S. PATENT DOCUMENTS

| 903,316 | 11/1908 | Reimunn | 285/47 X |
|---|---|---|---|
| 3,367,358 | 2/1968 | Rentschler | 137/375 |
| 3,559,694 | 2/1971 | Volberg | 285/47 |
| 3,874,711 | 4/1975 | Scalzo | 138/149 X |
| 4,046,406 | 9/1977 | Press et al. | 138/149 |

FOREIGN PATENT DOCUMENTS

| 981723 | 1/1976 | Canada | 285/236 |
|---|---|---|---|
| 391175 | 8/1908 | France | 285/47 |
| 180482 | 1/1936 | Switzerland | 285/47 |

Primary Examiner—Dave W. Arola
Attorney, Agent, or Firm—Robert M. Krone; Joseph J. Kelly

[57] ABSTRACT

A thermal insulation device for insulating irregularly shaped objects such as pipe flanges and fittings is described which comprises a flexible thermal insulation member of specified dimensions adhered to a cover sheet and also containing detection means for detecting leakage from the flange or fitting to be insulated. The device is removably attached to the flange or fitting by securing means. The device thus provides efficient thermal insulation of pipe flanges, fittings and the like while permitting easy and prompt detection of any leakage from within the structure.

9 Claims, 7 Drawing Figures

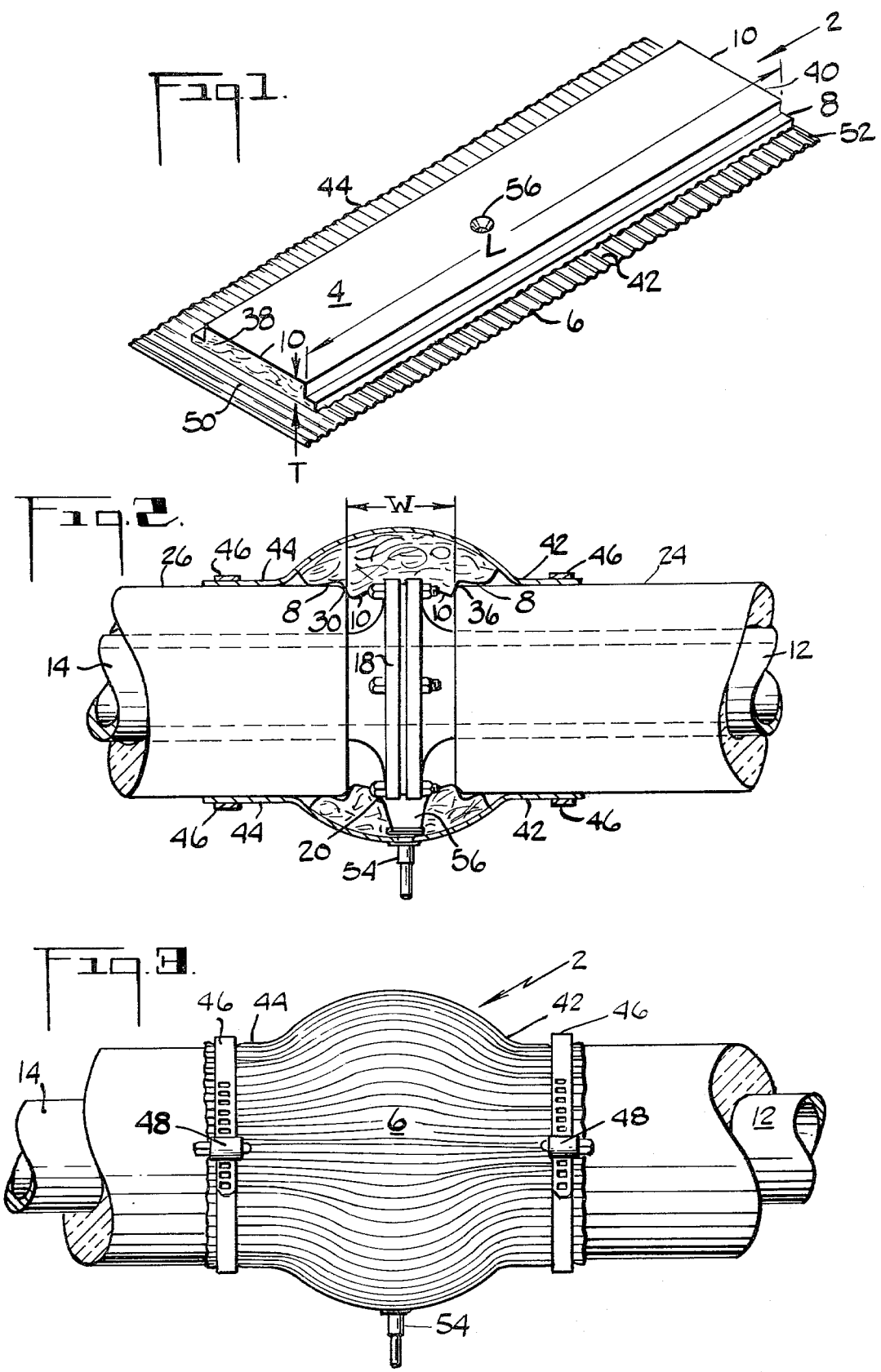

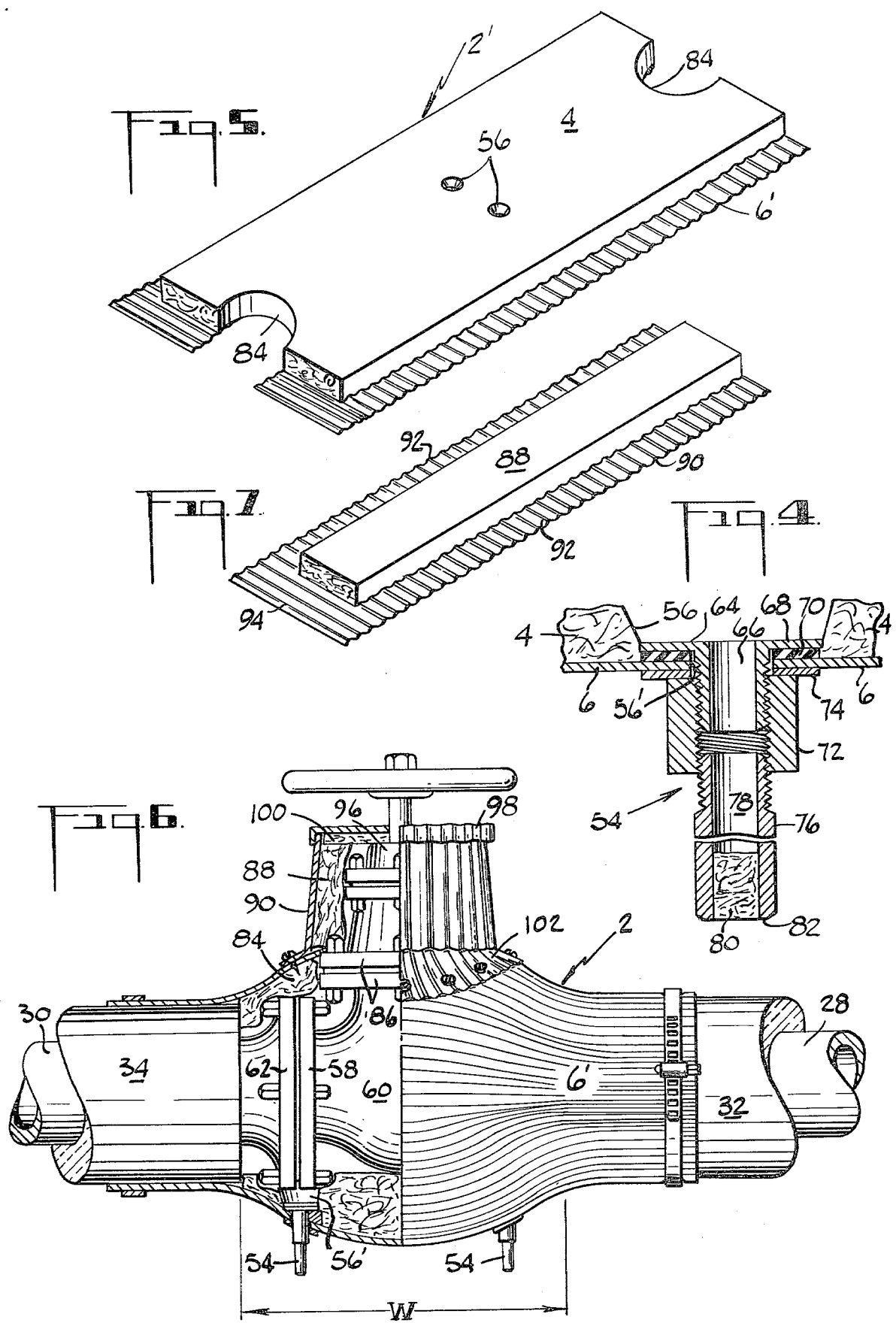

THERMAL INSULATION ESPECIALLY FOR PIPE, FLANGES AND FITTINGS

BACKGROUND OF THE INVENTION

The invention herein relates to thermal insulation. More particularly it relates to the thermal insulation useful for the insulation of pipe flanges and fittings.

In any oil refinery, chemical plant, power plant, or similar facility there are dozens or hundreds of pipe lines carrying high temperature fluids such as crude oil and petroleum products, water, steam and the like. Such lines normally have flanges or fittings every few feet of pipe run length. In the past it has been common to insulate the runs of straight or curved pipe with conventional solid or fibrous thermal insulation units.

Insulation of flanges and fittings has posed severe problems, however. In the first place, flanges and fittings present irregular shapes to which conventional semi-cylindrical or flat block pipe insulations do not conform. Thus resort has been had to specially molded insulations which are preformed to the irregular configuration of the specific fitting to be insulated; typical of such molded insulations is that shown in U.S. Pat. No. 3,367,358. Another alternative method of insulating flanges or fittings has been by using troweled or sprayed cements. While this avoids the problem of having to make individual molded insulations for each separate fitting, it has the disadvantages that the cemented insulations cannot be readily removed from the flange or fitting. The cement also tends to foul moving parts of fittings and bolted connections of flanges. Further, it is difficult to get relative uniformity of thickness of the cemented insulations and insulating effect is therefore variable.

An overriding consideration with both flanges and fittings has been that they frequently leak, particularly when the fluid inside the pipe is at a high pressure. With both molded insulations and cemented insulations such fluid leakage is trapped within the insulation where it can corrode or otherwise deteriorate both the pipe and the insulation. Where high pressure pipes are concerned, such internal corrosion is extremely hazardous, for it can substantially weaken a pipe and make it prone to explosion under pressure before any observer would become aware that leakage was occurring.

In view of the difficulty of insulating flanges and fittings, and more importantly because of the danger of internal leakage and corrosion around such flanges and fittings, most oil refiners, chemical plant operators, power plant operators and other users of such piping have elected to leave flanges and fittings uninsulated. This facilitates early leak detection and simplifies repair or replacement of leaking flanges or fittings. The economic and thermal cost of leaving the flanges or fittings uninsulated is extremely high, however. For instance it can be calculated from a recent article by Cordero, "The Cost of Missing Pipe Insulation," *Chemical Engineering*, 77–78 (Feb. 11, 1977) that the annual heat loss from a single uninsulated flanged coupling joining two 6" 400 psi steel pipes with a pipe surface temperature 400° F. above ambient is on the order of 90 million BTU's. When it is realized that a single typical oil refinery will have hundreds or thousands of such flanges and that fuel costs can be one dollar or more per million BTU's, the obvious cost in thermal energy wastage and dollar value throughout the United States and the world becomes staggering. Consequently, it is of the utmost importance to develop an efficient flange and fitting insulation which can be readily and easily installed, easily removed for inspection, repair or replacement of the insulated flange or fitting, and which for safety reasons permits rapid and positive detection of fluid leakage from the flange or fitting.

BRIEF SUMMARY OF THE INVENTION

The invention herein is a thermal insulation device for insulating objects which are subject to fluid leakage such as pipe flanges and fittings which comprises: (a) a thermal insulation member which has a width at least equal to the width of the object to be insulated and a length equal to the circumference of the object to be insulated; (b) a flexible cover sheet having a width and length each greater than the respective width and length of the thermal insulation member, and to one side of which the thermal insulation member is adhered, the cover sheet forming the outer surface of the thermal insulation device when the device is installed; (c) detection means passing through the thermal insulation member and the cover sheet to detect fluid leakage from the object to be insulated and to provide observable indication outside of the thermal insulation device that leakage has occurred from the object; and (d) securing means to removably secure the device in position surrounding the object to be insulated. In a preferred embodiment the detection means comprises a hollow tube penetrating both the thermal insulation member and the cover sheet and containing therein wicking into which leaking fluid will be absorbed and transferred to the outer end of the device for visual observation. The detection device is normally positioned directly below the lowest point of the portion of the object from which leakage is expected to occur.

BRIEF DESCRIPTION OF THE DRAWINGS

FIG. 1 is a perspective view of one embodiment of the device of this invention.

FIG. 2 is an elevation view partially in cross-section showing the device of FIG. 1 installed as insulation around a typical flanged pipe coupling.

FIG. 3 is an elevation view of the outward appearance of the installation of FIG. 2.

FIG. 4 is a cross-sectional view of a typical embodiment of the detection means of this invention.

FIG. 5 is a perspective view of another embodiment of the device of this invention.

FIG. 6 is an elevation view partially in cross-section of the device of FIG. 5 installed on a typical pipe valve.

FIG. 7 is a perspective view of an auxiliary insulation used to insulate the upper portion of the valve of FIG. 6.

DETAILED DESCRIPTION AND PREFERRED EMBODIMENTS

The device of this invention can be best understood by reference to the drawings.

FIGS. 1, 2 and 3 illustrate the embodiment of the invention particularly suited for insulating flanges. The device (generally designated 2) comprises a thermal insulation member 4 which is adhered to one major surface of a cover sheet 6. The insulation member 4 may be any flexible thermal insulation material. Such material includes flexible insulating polymeric foams and batts of fibrous insulation. The fibrous insulations, which are preferred because of their greater service temperature ranges, include mineral wool, rock wool, glass fiber, refractory fiber and the like. The cover sheet 6 may also be made of a wide variety of flexible materials. For some services materials such as rubber sheets and synthetic polymer sheets such as polyvinylchloride sheets will be entirely satisfactory. Preferred however, are metal sheets, because of their greater resistance to impact damage. A variety of different metals may be used including various steels, aluminums and the like. The particular metal to be used in the cover sheet 6 will normally be chosen on the basis of economics and the type of environment which will surround the insulated fittings. For instance, if the insulated fitting is to be in a coastal oil refinery where there is a salt air atmosphere, a corrosion resistant metal such as stainless steel would normally be selected.

In the embodiment shown, flexibility of the cover sheet is obtained by corrugations which allow the metal to be curved and formed to the configuration shown in FIG. 3. Flexibility of this type may be imparted by other means than corrugation, however; for instance the sheet metal could be dimpled to obtain the same flexibility effect. Consequently, while corrugations are preferred as being most easily formed in sheet metal, the invention herein encompasses other forms of imparting flexibility to the metal cover 6.

In the embodiment shown in FIG. 1 the insulation member 4 has a stepped edge 8. The overall width of the narrower portion 10 of the insulation body 4 is equal to or very slightly larger than the width W of the flange to be insulated. As used herein the dimension W is sometimes referred to as the "width" of the fitting, flange or other structure to be insulated. This is defined as the distance between the adjacent ends of the conventional pipe insulation on the adjoining pipes. This is best illustrated in FIGS. 2 and 6. In FIG. 2 pipes 12 and 14 terminate respectively in flanges 16 and 18. These flanges in turn are conventionally bolted together by bolts 20 and will normally have a sealing gasket 22 between them to control leakage. Pipes 12 and 14 are themselves insulated with conventional semi-cylindrical or "half round" sections of conventional pipe insulation 24 and 26. However, because of the structure of the flanged ends of pipes 12 and 14 insulation members 24 and 26 cannot adjoin each other any closer than the distance indicated by the dimension W. Consequently it is this "width" W which remains uninsulated in conventional practice but which is to be insulated by the device of the present invention. Similarly, in the structure shown in FIG. 6 where the object to be insulated is a valve rather than a flange, pipes 28 and 30 are insulated by conventional pipe insulation sections 32 and 34 respectively. Because of the flanged ends of pipes 28 and 30 and the flanged structure of the fitting, insulation members 32 and 34 again cannot approach any closer than the distance indicated by the dimension W. As is evident, the dimension W will differ for different types of flanges, fittings and other structures to be insulated by the device of this invention. It is that dimension W for a particular structure to be insulated which, however, will determine the width of the insulation body used in the device of this invention.

Considering again FIGS. 1 and 2, it will be seen that the overall width of the narrower portion 10 of the insulation member 4 will be equal to or slightly greater than the dimension W. That narrower portion of insulation therefore is able to fit snugly into the gap left by the conventional insulation members 24 and 26 as indicated in FIG. 2. The shoulder or stepped portion 8 of the insulation body then folds over the outer edge of the conventional insulation 24 or 26 as indicated at 36. This creates the effect of a ship lap joint and prevents the formation of heat flow paths if the various insulation members and pipes should move and contract or expand slightly.

The thickness T of the insulation will be chosen on the basis of conventional heat flow calculations and will depend on factors such as the material and thermal conductivity of the insulation itself and the difference between the temperature of the pipe surface and the ambient temperature. Also the thickness chosen must not be so great that the flexibility of the device is severely impaired. The degree of flexibility required will of course be a factor of the pipe size and circumference around which the insulation device must be bent.

The length L of the insulation member will be equal to the circumference of the object to be insulated such that when the insulation is bent around the object a clean butt joint will be formed by the two ends of the insulation 38 and 40.

The cover sheet 6 is as noted preferably a corrugated metal sheet, and this is the embodiment shown. The width of the cover sheet will be substantially greater than the width of the insulation such that there will be strips 42 and 44 exposed on either side of the insulation. These strips 42 and 44, as shown in FIG. 2, are used to secure the device to the adjacent pipe insulation members 24 and 26. Such securing may be achieved by strips of tape, wire or other securement means. Preferred however is the use of perforated strips or hose clamps 46. These are readily tightened by use of conventional tightening devices 48 common to such hose clamps.

The length of cover strip 6 is normally longer than the length L of insulation member 4. This provides for a lap strip 50 at one end of the device (the end 40 of the insulation body 4 and the end 52 of cover strip 6 being aligned at the end opposite to lap strip 50). Lap strip 50 thus functions upon installation of the device to lap over a small portion of the cover sheet 6 at ends 52 so as to form a weather tight joint.

Critical to the successful functioning of the device of this invention is leak detection means 54 shown in detail in FIG. 4. Leak detection means 54 is emplaced in the device through an opening 56 which penetrates both the insulation member 4 and the cover sheet 6. Opening 56 and leak detection means 54 are aligned such that when the device 2 is installed opening 56 and leak detection means 54 are disposed in line with and at the lowest point directly below that portion of the object to be insulated which is most likely to incur leakage. For instance in FIG. 2 opening 56 and leak detection means 54 are disposed directly beneath the center of the coupling formed by flanges 16 and 18. Similarly, in FIG. 6 the openings 56 and leak detection devices 54 are disposed directly beneath the center of the couplings formed by flange 58 of valve 60 and flange 62 of pipe 30 (and the counterpart coupling formed by the flange at the other end of valve 60 and the flange of pipe 28, not shown). Any leakage from these points thus immediately flows through opening 56 and into leak detection device 54 for observation.

Leak detection means 54 is best illustrated in FIG. 4. The upper portion consists of a threaded T-shaped structure 64 which has a hollow central opening 66 and a flange 68. Normally and preferably the entire device is circular so that the threads can be utilized to screw the entire device together. However it could be constructed in other shapes if force fitting sections or flanged sections secured by sheet metal screws were used instead of thread coupled sections. The flanges 68 rest on top of washer 70 which serves as a sealing device. The upper section 64 passes through the opening 56 in insulation member 4 and opening 56' in cover sheet 6 and projects downwardly therefrom. It is secured to the cover sheet 6 by the use of threaded ferrule 72 which is threadedly connected to the upper section 64 and bears against washer 74 on the outer side of cover sheet 6. In turn lower section 76 is threaded into ferrule 72. Lower section 76 has a hollow core 78 which is at least partly filled with wicking 80, with the lower edge of the wicking being substantially flush with the outer end 82 of lower section 76. The wicking 80 serves to draw any leaking fluid to the outer end 82 of the leak detection means 54 such that the leaking fluid can be readily observed visually, either by presence of moisture at the end of the wicking or by discoloration of the wicking 80. If desired, upper section 64 and lower section 76 of the leak detection means 54 may be a single unit with threads over the entire length of the projecting portion. However the structure shown in FIG. 4 utilizing a separate upper section 64 and lower section 76 is preferred because it permits the lower section 76 to be readily removed for repacking it with clean wicking periodically or after detection of a leak without removing the entire leak detection means 54 from the insulation device. Periodic repacking of wicking is frequently necessary for many valves and flanges leak slightly over extended periods. Such very slow leakage is not considered detrimental to the operation of the pipe fitting or flange but would over a period of time cause the wicking to become filled with fluid and/or discolored and therefore give a false indication of a significant leak. Repacking with clean wicking permits the operator to distinguish between sudden and significant leaks and the routine slow accumulation of minor quantities of fluid leakage.

While the leak detection means 54 has been described with wicking 80 for visual detection of leaks, it is intended that other observations means may also be used. For example, if the leaking fluid is electrolytic, a pair of spaced apart electrical contacts may be emplaced in the cove 78 (or in the wicking 80) such that accumulation of fluid closes an electrical circuit and activates an alarm or control or warning device, either locally or at a remote monitoring station.

FIGS. 5, 6 and 7 illustrate the embodiment of this invention for insulating more irregularly shaped objects such as valves, tees, wyes, and the like fittings. The device 2' in FIG. 5 is basically similar in configuration to the device 2 in FIG. 1 except that at each end there is a semi-circular portion 84 removed. The diameter of the semi-circular portion 84 is just equal to the diameter of the upper flanges 86 of the fitting such that when the device is wrapped around the fitting the two semi-circular portions abut to form a circular opening equal in diameter to the flanges 86. Also shown in the embodiment of FIG. 5 are two openings 56' to accommodate the pair of leak detection means 54 required with the two sets of flanged couplings in the fitting shown in FIG. 6.

FIG. 7 illustrates the insulation body which completes the insulation structure to insulate the valve in FIG. 6. An insulation body 88 is adhered to a cover strip 90. The slightly greater size of the cover strip 90 creates side strips 92 and lap strip 94 at one end. This entire structure is curved around the top portion 96 of valve 60 to insulate the upper section. The entire structure is then capped by a cap 98 which may itself have insulation 100 adhered to the inside of it. The cover strip 90 may be curved or slotted to allow it to conform to the outer configuration of the basic device 2' as shown by the skirt 102.

What is claimed is:

1. A thermal insulation device for insulating irregularly shaped objects such as pipe flanges and fittings which comprises:
    (a) a single flexible thermal insulation member which has a width at least equal to the width of the object to be insulated and a length equal to the circumference of the object to be insulated;
    (b) a single flexible cover sheet having a width and length each greater than the respective width and length of said thermal insulation member, and to one side of which said thermal insulation member is adhered, said cover sheet forming the outer surface of said thermal insulation device when said device is installed;
    (c) detection means passing through said thermal insulation member and said cover sheet to detect leakage of fluid from said object to be insulated and to provide observable indication outside of said thermal insulation device that leakage has occurred from said object; and
    (d) securing means to removably secure said device in position surrounding said object to be insulated.
2. A device as in claim 1 wherein said flexible thermal insulation member comprises a fibrous thermal insulation.
3. A device as in claim 2 wherein said fibrous thermal insulation member comprises glass fiber.
4. A device as in claim 1 wherein said flexible cover sheet comprises a sheet of corrugated metal.
5. A device as in claim 1 wherein said thermal insulation member and said cover sheet are aligned at one end thereof.
6. A device as in claim 1 wherein said detection means comprises an elongate object having an opening therethrough extending from inside said device to the outside thereof, said opening being at least partially filled with a wicking material.
7. A device as in claim 1 wherein said securing means comprises hose clamps which encircle the outer surface of said cover sheet.
8. A device as in claim 1 wherein a portion of each end of said thermal insulation member and said cover sheet is absent, said absent section conforming in configuration to a projecting portion of the object to be insulated, such that when the device is installed it conforms to and abutts the outer surface of the projecting portion.
9. A device as in claim 8 wherein each of said absent portions is semi-circular in configuration.

* * * * *